US007341366B2

(12) United States Patent
Iwasaki

(10) Patent No.: US 7,341,366 B2
(45) Date of Patent: Mar. 11, 2008

(54) PROJECTOR TYPE VEHICLE HEADLAMP UNIT

(75) Inventor: Kazunori Iwasaki, Isehara (JP)

(73) Assignee: Ichikoh Industries, Ltd. (JP)

( * ) Notice: Subject to any disclaimer, the term of this patent is extended or adjusted under 35 U.S.C. 154(b) by 83 days.

(21) Appl. No.: 11/249,645

(22) Filed: Oct. 12, 2005

(65) Prior Publication Data

US 2006/0098450 A1 May 11, 2006

(30) Foreign Application Priority Data

Oct. 13, 2004 (JP) ........................... P2004-298810

(51) Int. Cl.
*B60Q 1/00* (2006.01)

(52) U.S. Cl. ...................... 362/538; 362/297; 362/296; 362/545

(58) Field of Classification Search ................ 362/358, 362/297, 509, 296, 545, 539
See application file for complete search history.

(56) References Cited

U.S. PATENT DOCUMENTS 4,914,747 A 4/1990 Nino
6,773,146 B2 * 8/2004 Ishida ........................ 362/460
6,948,836 B2 * 9/2005 Ishida et al. ................ 362/516
7,150,552 B2 * 12/2006 Weidel ....................... 362/545
2001/0040807 A1 * 11/2001 Luce .......................... 362/296
2002/0191395 A1 * 12/2002 Fleury ........................ 362/236

FOREIGN PATENT DOCUMENTS

EP 1357332 A2 10/2003
JP 2003-229006 8/2003

* cited by examiner

*Primary Examiner*—Renee Luebke
*Assistant Examiner*—Vanessa Girardi
(74) *Attorney, Agent, or Firm*—Kilpatrick Stockton LLP

(57) ABSTRACT

A reflector is constructed by arranging two first reflecting surfaces. The two first reflecting surfaces are arranged by making first focal points F1 of the first reflecting surfaces be alienated from each other, centering on the optical axis Z within an area of an effective diameter R of a convex lens, and making second focal points F2 thereof gradually come close to each other so as to be located inside the two first focal points F1. An LED is formed of two LEDs respectively arranged near the first focal positions, with light emitting points F1 thereof facing one of the two first reflecting surfaces. The obtained light distribution pattern has double quantity of light, and does not have a non-emission part inside thereof, and the combined light of the two LEDs can solve a problem of color irregularity.

2 Claims, 6 Drawing Sheets

PROJECTOR TYPE VEHICLE HEADLAMP UNIT

BACKGROUND OF THE INVENTION

1. Field of the Invention

The present invention relates to a projector type vehicle headlamp unit using a light emitting diode (LED) as a light source, which can form a headlamp by assembling one or a plurality of units in a lamp housing.

2. Description of the Related Art

FIGS. 1A and 1B show a projector type vehicle headlamp unit 100 (Japanese Patent Application Laid-open No. 2003-229006). This unit 100 is provided to solve problems in that the LED as the light source has high intensity and looks like arrangement of spots, a reflecting surface does not reflect light beautifully, and the LED cannot form a large light-emitting surface. The unit 100 includes an LED 1 mounted on a printed circuit board 104, a first reflecting member 101 arranged so as to surround the front of the LED 1, a second reflecting member 102 arranged opposite to the reflecting member 101, and a light distribution control lens 103 arranged in front of the second reflecting member 102. A reflection coating 101*a* of the first reflecting member 101 is formed by rotating a part of an elliptical curved surface having a first focal position F1 located near a light-emitting section 1*a* of the LED 1 and a second focal position F2 located away from an optical axis Z and obliquely forward from the light-emitting section 1*a* of the LED 1, in the shown example. In FIG. 1B, reference numeral 105 denotes a translucent cover.

According to the unit 100, at the time of lighting the LED 1, the light thereof is reflected by the reflection coating 101*a* of the first reflecting member 101, converges on the second focal position F2, and the light converged on the second focal position F2 is reflected by the reflection coating 102*a* of the second reflecting member 102, and proceeds forward as parallel beams. The parallel beams enter into the light distribution control lens 103, and is aimed and light distribution of the beam is controlled. Accordingly, the parallel beams are irradiated forward, to achieve the initial object. In FIG. 1A, the emission part is shown by hatching lines.

However, the unit 100 has a problem in that since a non-emission part appears in the middle of the light-emitting surface (see FIG. 1A), the suitability as the vehicle headlamp is not sufficient.

Since the unit 100 is for constituting one headlamp unit by one LED, color irregularity at the time of lighting the LED appears by 100%, thereby causing deterioration in the appearance at the time of lighting the LED.

Furthermore, since the unit 100 is for constituting one headlamp unit by one LED, if a plurality of LEDs are to be installed due to insufficient illuminance, the unit 100 must be installed corresponding to the number of LEDs, thereby causing a problem in which the entire headlamp becomes large.

SUMMARY OF THE INVENTION

It is therefore an object of the present invention to provide a projector type vehicle headlamp unit that has adaptability as a vehicle headlamp, solves a problem of color irregularity at the time of lighting the LED to improve the appearance, and can be constructed in a compact form.

To achieve the objects, one aspect of the present invention provides a projector type vehicle headlamp unit including a plurality of LEDs as light sources, a reflector that reflects light from the LEDs, and a convex lens that emits the light reflected by the reflector forward. The reflector has two first reflecting surfaces arranged in parallel, provided on the upper side at the back of an optical axis of the convex lens, formed inside a casing with a spheroidal curved surface or a free-form surface based on a spheroid, having the front part and the lower part being open. The two first reflecting surfaces are arranged by making first focal points of the first reflecting surfaces be alienated from each other in the horizontal direction, centering on the optical axis within an area of an effective diameter of the convex lens, and making second focal points thereof gradually come close to each other so as to be located inside the two first focal points. The LEDs include two LEDs respectively arranged near the first focal positions, with light emitting portions thereof facing the two first reflecting surfaces, respectively.

Therefore, according to this configuration, the respective lights from the two LEDs are emitted toward the corresponding first reflecting surfaces, reflected by the first reflecting surfaces, converge on near the second focal points of the first reflecting surfaces, reach the convex lens, and project an appropriate light distribution pattern via the convex lens. The light distribution pattern obtained at this time has double quantity of light, and a light distribution pattern having no non-emission part inside thereof can be projected.

Furthermore, even if color irregularity occurs at the time of lighting the LED individually, the unit itself emits light obtained by combining the lights from the two LEDs; hence the color irregularity can be reduced. Accordingly, occurrence of color irregularity at the time of lighting the LED can be avoided, thereby improving the appearance at the time of lighting the LED.

Since the unit is formed by assembling two LEDs, the area occupied by the individual LED can be reduced as compared to a unit that uses only one LED.

Furthermore, since the two first reflecting surfaces are arranged in parallel by making the first focal points be alienated from each other within an area of an effective diameter of the convex lens, the size of the entire unit can be reduced.

Furthermore, the two first reflecting surfaces may be arranged by making the second focal points coincident with each other near the optical axis, and the LEDs may be arranged near the respective first focal positions of the two first reflecting surfaces having an outer size within the outer diameter of the convex lens.

Therefore, according to this configuration, the overall size of the unit including the vertical and the horizontal directions can be made within the outer diameter of the convex lens. Accordingly, the entire headlamp having the unit built therein can be made more compact.

The reflector may include a sub-reflector arranged between the convex lens and the LEDs and having a substantially flat second reflecting surface along the optical axis of the convex lens and having a shading function. The second reflecting surface has a central step formed along the optical axis, and a high-position reflecting surface and a low-position reflecting surface formed on both sides of the central step. The two LEDs may be arranged with the positions thereof being shifted from the respective first focal positions of the two first reflecting surfaces toward the portions where the high-position reflecting surfaces are formed.

According to this configuration, a light distribution pattern having a cut line can be demonstrated by the shape of the end face of the second reflecting surface of the sub-reflector.

The two LEDs are respectively arranged with the position thereof being shifted in the same direction from the respective first focal positions of the two first reflecting surfaces. The shifted direction is determined by on which side of the central step the high-position reflecting surface formed on the second reflecting surface of the sub-reflector is formed.

In other words, when the high-position reflecting surface is formed on the left or the right side of the central step, the two LEDs are respectively arranged with the position thereof being shifted to the left or the right from the respective first focal positions of the two first reflecting surfaces. Accordingly, a hot-zone in the light distribution pattern can be brought closer to the shifted position. Therefore, the expansion of the light distribution is increased toward the shoulder of the road, thereby improving the visibility of the driver.

DESCRIPTION OF THE PREFERRED EMBODIMENTS

Figure 1A:
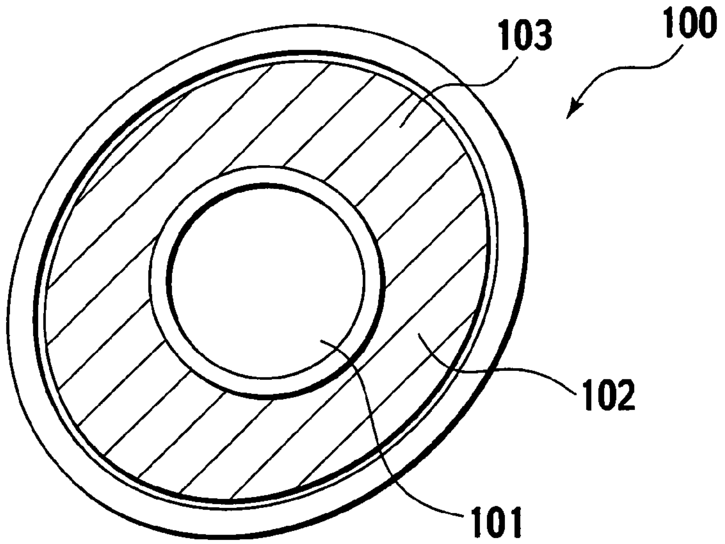
FIG.1A PRIOR ART
FIGS. 1A and 1B show a conventional projector type vehicle headlamp unit, FIG. 1A being a front elevation and FIG. 1B being a longitudinal side view.
Figure 1B:
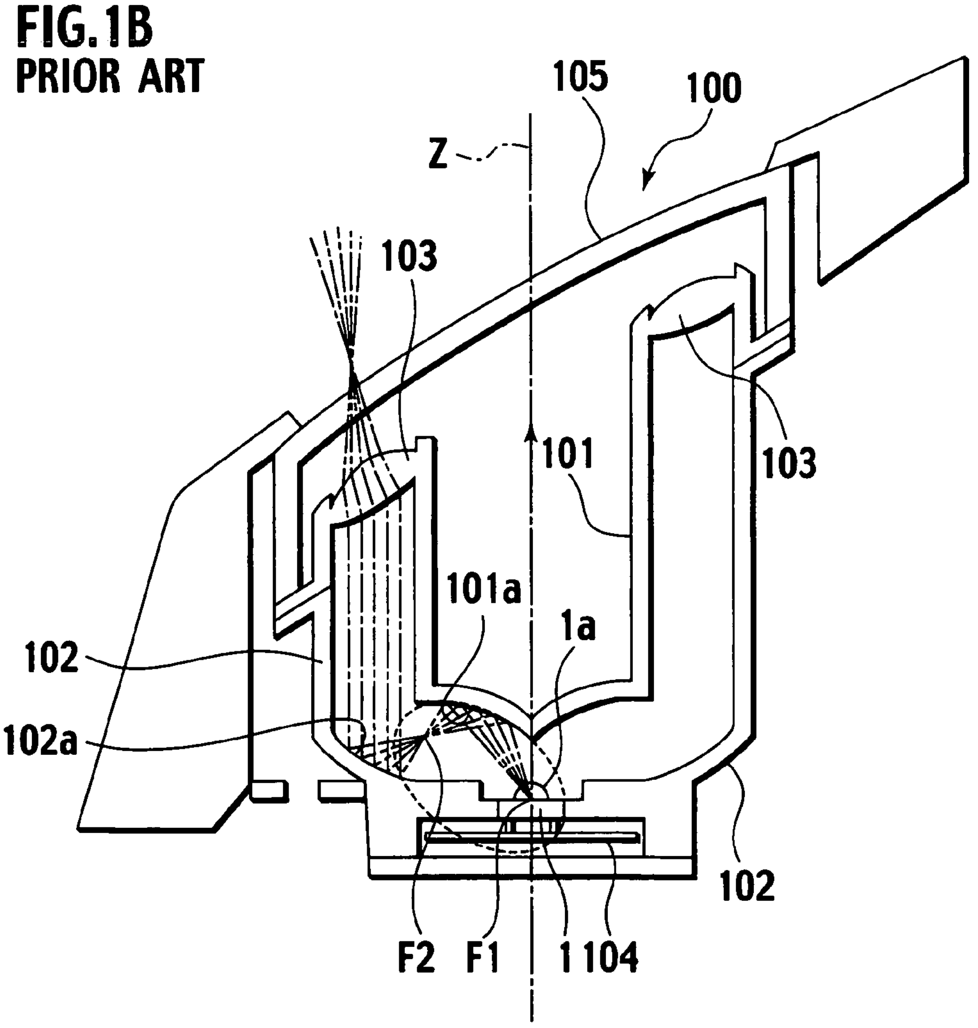
FIG.1B PRIOR ART
Figure 2:
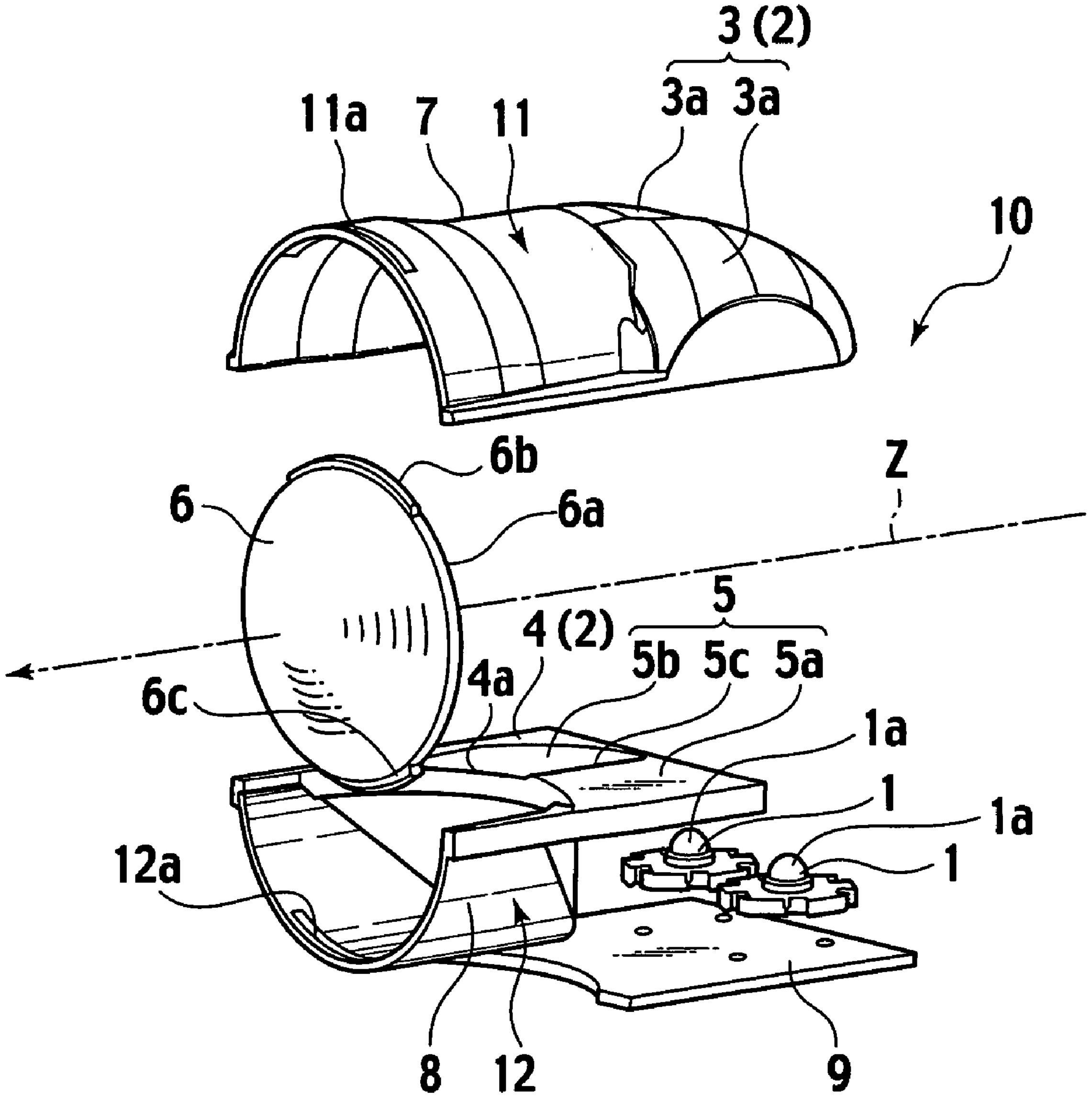
FIG. 2 is an exploded perspective view of a projector type vehicle headlamp unit according to a first embodiment of the present invention.

Embodiments of the present invention will be explained below with reference to the drawings. Constituent elements having the same functions as those disclosed in FIGS. 1A and 1B are designated with like reference numerals.

FIGS. 2 to 4C show a projector type vehicle headlamp unit 10 according to a first embodiment of the present invention. The unit 10 is substantially formed so that the light of LEDs 1 as light sources is reflected by a reflector 2 and emitted forward via a convex lens 6.

Figure 4A:
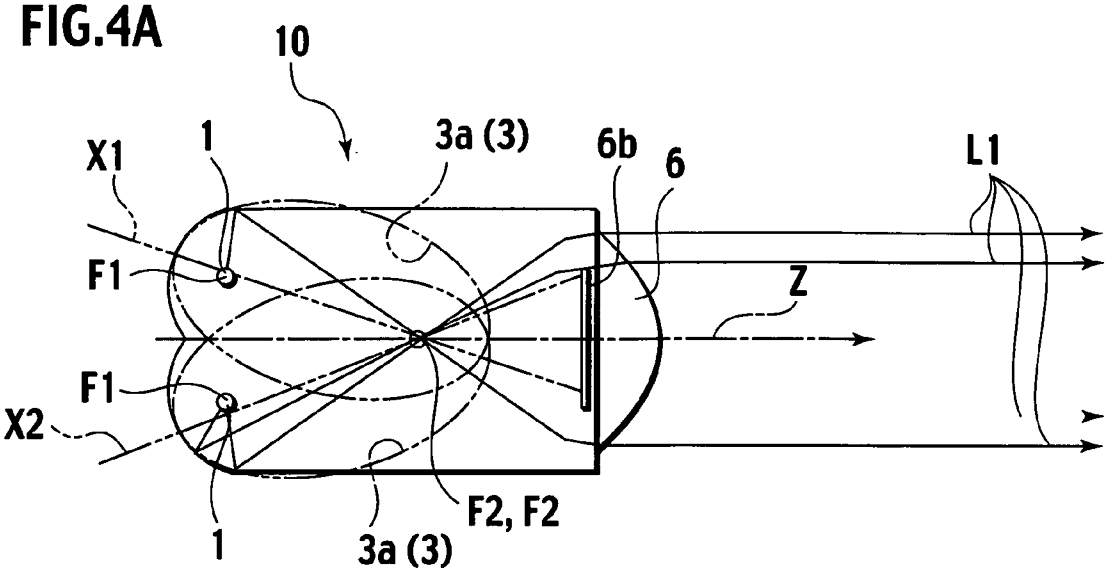
FIGS. 4A, 4B, and 4C are diagrams for explaining an optical path of the projector type vehicle headlamp unit in FIG. 3, FIG. 4A showing an optical path as seen in plan view in an assembled state, FIG. 4B showing an optical path as seen in plan view with an upper casing being removed, and FIG. 4C showing an optical path as seen in side view with the upper casing removed.
Figure 4B:
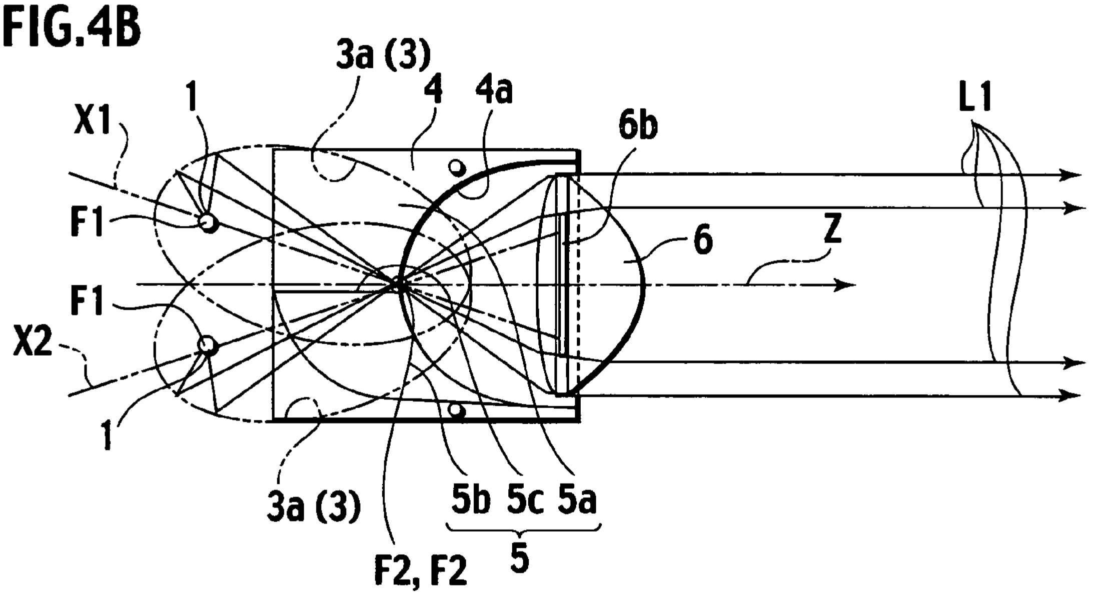
Figure 4C:
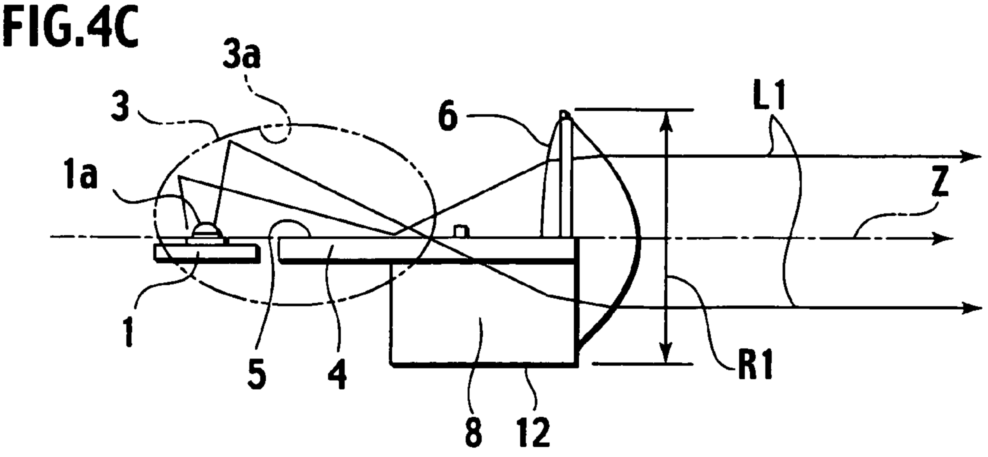

At this time, the reflector 2 includes a main reflector 3 formed by arranging two first reflecting surfaces 3*a* (see FIG. 4A) in parallel, which are provided on the upper side at the back of an optical axis Z of the convex lens 6, and are formed inside with a spheroidal curved surface or a free-form surface based on a spheroid, and the main reflector 3 has the front part and the lower part being open. Further, the reflector 2 has a sub-reflector 4 arranged between the convex lens 6 and the LED 1 and having a shading function with a substantially flat second reflecting surface 5 along the optical axis Z of the convex lens 6. An ellipse shown by two-dot chain line in FIGS. 4A, 4B, and 4C shows the free-form surface based on the spheroidal curved surface or the spheroid forming the first reflecting surfaces 3*a*.

The two first reflecting surfaces 3*a*, 3*a* are arranged in parallel by making first focal points F1, F1 of the first reflecting surfaces 3*a* be alienated from each other in the horizontal direction, centering on the optical axis Z within an area of an effective diameter R of the convex lens 6, and making second focal points F2, F2 thereof gradually come close to each other so as to be located on the second reflecting surface 5 inside the two first focal points F1, F1.

In other words, the two first reflecting surfaces 3*a*, 3*a* are arranged in parallel, by setting the crossing state obtained by two reflecting-surface reference axes X1, X2 passing the first focal points F1 and the second focal points F2 thereof, which allow the second focal points F2, F2 to come close to each other gradually and be located on the second reflecting surface 5 inside the two first focal points F1, F1, and allow the first focal points F1, F1 to be alienated from each other, within the effective diameter R of the convex lens 6.

The LED is formed of two LEDs 1, 1 respectively arranged near the first focal positions F1 of the two first reflecting surfaces 3*a*, with light emitting portions 1*a* thereof facing one of the two first reflecting surfaces.

More specifically, the main reflector 3 is formed as an upper casing 11 as a whole, by extending an upper lens holder 7 having a substantially semicircular cross section with the lower part being open, at the front opening thereof. In the upper casing 11, a front edge thereof is formed in a semicircular shape along the circumference of the convex lens 6, and an upper engagement hole 11*a* is formed in a long hole shape along the circumference of the upper casing 11 at the top of the front edge thereof. The entire upper casing 11 is integrally formed of a resin material.

The sub-reflector 4 includes a front edge 4*a* formed along a meridional image surface and the second reflecting surface 5 extended at the back of the front edge 4*a*, and the entire sub-reflector 4 is formed as a lower casing 12 by extending a lower lens holder 8 having a substantially semicircular cross section with the upper part being open, at the front edge 4*a*. The front edge of the lower casing 12 is formed in a semicircular shape along the circumference of the convex lens 6, and a lower engagement hole 12*a* in a rectangular hole shape along the circumference is formed in a long hole shape along the circumference of the lower casing, and the entire lower casing 12 is integrally formed of a resin material.

At this time, the second reflecting surface 5 includes a central step 5*c* formed along the optical axis Z of the convex lens 6, and a high-position reflecting surface 5*a* and a low-position reflecting surface 5*b* formed at the opposite sides of the central step 5*c*.

The upper and lower casings 11 and 12 are integrally formed by using, for example a thermoplastic resin such as a polycarbonate resin or an acrylic resin, and the inside of the entire casing is applied with coating or deposition including a reflection function. Since the upper and lower casings 11 and 12 are integrally formed of the main reflector 3 and the sub-reflector 4 as the component, the number of parts can be reduced and improvement in the optical position accuracy can be realized.

The convex lens 6 is formed in a biconvex aspherical shape by using a transparent thermoplastic resin such as the acrylic resin, including an upper engagement protrusion 6*b* and a lower engagement protrusion 6*c*, respectively, at the upper part and the lower part of a thin flange portion 6*a* provided on the circumference of the convex lens 6.

The convex lens 6 is integrally fitted to the casing by engaging the upper and lower engagement protrusions 6*b* and 6*c* with the upper and lower engagement holes 11*a* and 12*a*, and coupling the upper and lower casings 11 and 12 with each other by using a coupling means such as a screw.

The two LEDs 1, 1 are adhered to a predetermined position on an LED fitting plate 9, and arranged respectively near the respective first focal positions F1 of the two first reflecting surfaces 3*a*, 3*a* by coupling the LED fitting plate 9 with the lower face of the sub-reflector 4. The LED fitting plate 9 can be made of a good heat-conducting metal such as aluminum, and can be provided with a radiator such as a radiation fin, as required.

The projector type vehicle headlamp unit 10 formed in this manner can constitute a headlamp by assembling one or a plurality of units in a lamp housing.

Figure 6:
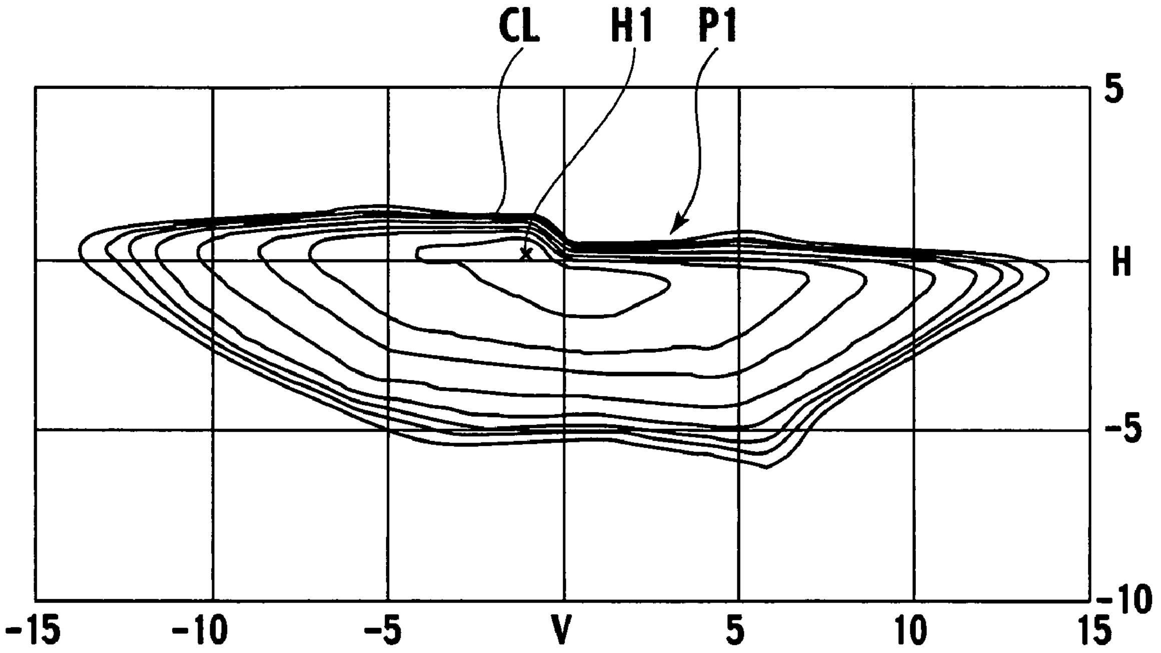
FIG. 6 is a graph showing a light distribution pattern demonstrated by the projector type vehicle headlamp unit according to the first embodiment.

That is, according to the unit 10, the respective lights L1 of the two LEDs 1, 1 are emitted toward the respective first reflecting surfaces 3*a*, 3*a* of the corresponding main reflector 3, reflected by the respective first reflecting surfaces 3*a*, 3*a*, to converge on near the intersection formed by making the second focal points F2, F2 on the second reflecting surface 5 of the sub-reflector 4 coincident with each other, and are reflected again by the second reflecting surface 5 or directly reach the convex lens, to project an appropriate light distribution pattern forward via the convex lens 6. A light distribution pattern P1 obtained at this time is shown in FIG. 6.

The light distribution pattern P1 has double quantity of light, does not have a non-emission part therein, and hence, is suitable for low beam having a cut line CL due to the shape of the front edge 4*a* of the second reflecting surface 5. In FIG. 6, reference symbol H1 denotes the center of a hot zone.

According to the unit 10, even if color irregularity occurs at the time of lighting the LEDs 1, individually, the unit 10 itself emits light obtained by combining the lights from the two LEDs 1, 1; hence the color irregularity can be reduced. Accordingly, occurrence of color irregularity at the time of lighting the LED can be avoided, thereby improving the appearance at the time of lighting the LED 1.

Since the unit 10 is formed by assembling two LEDs, the area occupied by the individual LED 1 can be reduced as compared to a unit that uses only one LED.

Furthermore, since the two first reflecting surfaces 3*a*, 3*a* are arranged in parallel by making the respective first focal points F1, F1 be alienated from each other within an area of the effective diameter of the convex lens, and by setting the crossing state obtained by the two reference axes X1, X2 of the reflecting surfaces 3*a* within the effective diameter R of the convex lens 6, the size of the whole unit 10 can be reduced.

According to the unit 10, therefore, the entire headlamp having the unit 10 built therein can be made compact.

The projector type vehicle headlamp unit 10 is preferably formed in the following configuration.

That is, the two first reflecting surfaces 3*a*, 3*a* are arranged in parallel by making the second focal points F2, F2 coincident with each other near the optical axis Z on the second reflecting surface 5, and the LED 1 is arranged near the respective first focal points F1 of the two first reflecting surfaces 3*a*, 3*a* of the main reflector 2 having an outer size within the outer diameter R1 of the convex lens 6.

Figure 3:
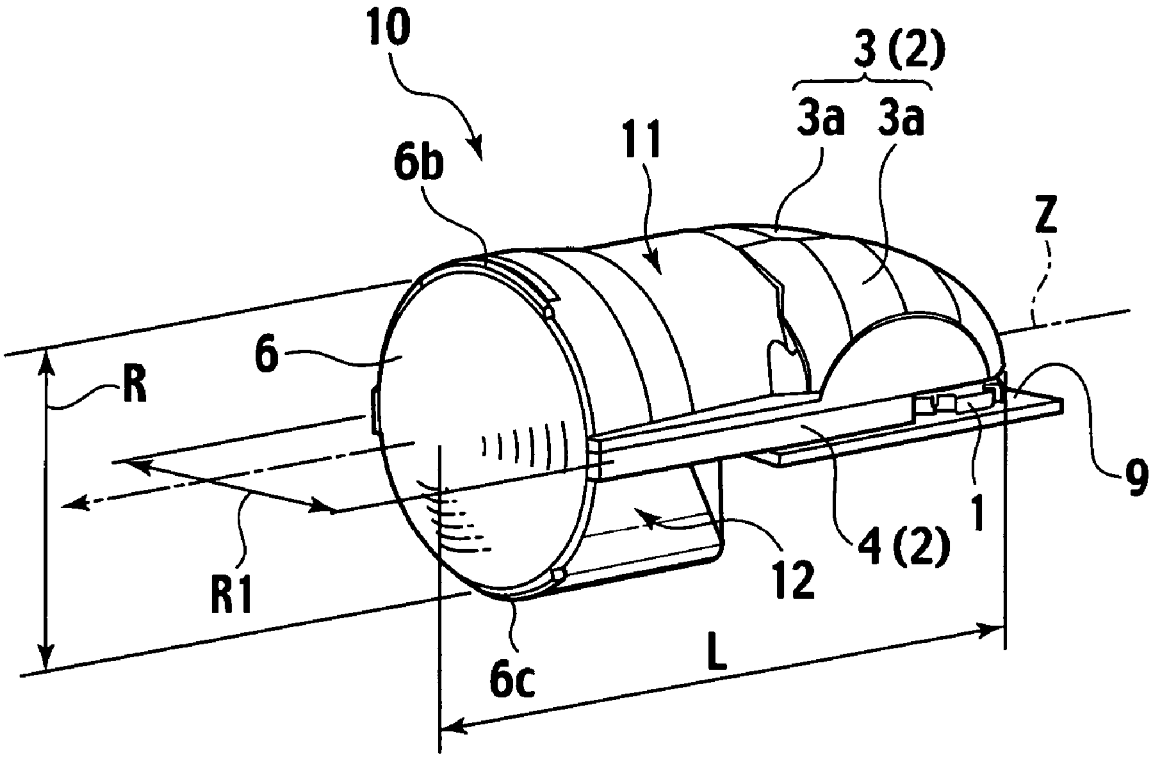
FIG. 3 is a perspective assembly diagram of the projector type vehicle headlamp unit in FIG. 2.

That is, the two first reflecting surfaces 3*a*, 3*a* are arranged in parallel, by substantially making the intersection of the two reflecting-surface reference axes X1 and X2 (coincident point of respective second focal points F2) coincident with the optical axis Z of the convex lens 6 on the second reflecting surface 5 (see FIG. 4B), and the LED 1 is arranged near the respective first focal points F1 of the two first reflecting surfaces 3*a*, 3*a* of the main reflector 3 having the outer size within the outer diameter R1 of the convex lens 6 (see FIG. 3).

More specifically, the two first reflecting surfaces 3*a*, 3*a* are formed so that the intersection of the two reflecting-surface reference axes X1 and X2 (coincident point of respective second focal points F2) of the two first reflecting surfaces 3*a* is positioned at the center of the front edge 4*a* of the sub-reflector 4. At this time, the convex lens 6 is arranged so that the focal point of the lens is coincident with the intersection of the two reflecting-surface reference axes X1 and X2.

With this configuration, the entire size of the unit 10 including the horizontal direction and the vertical direction can be formed within the outer diameter R1 of the convex lens 6 (see FIG. 4C). Accordingly, the entire headlamp having the unit 10 built therein can be made compact more reliably.

Figure 5A:
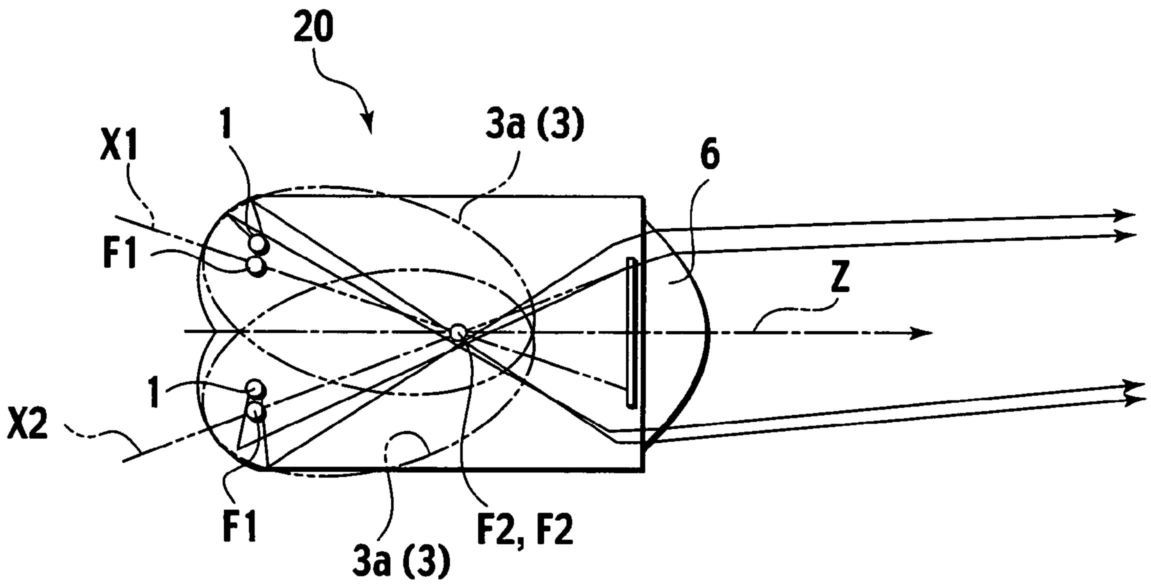
FIGS. 5A and 5B are diagrams for explaining an optical path of the projector type vehicle headlamp unit according to a second embodiment of the present invention, FIG. 5A showing an assembled state, and FIG. 5B showing a state that the upper casing is removed.
Figure 5B:
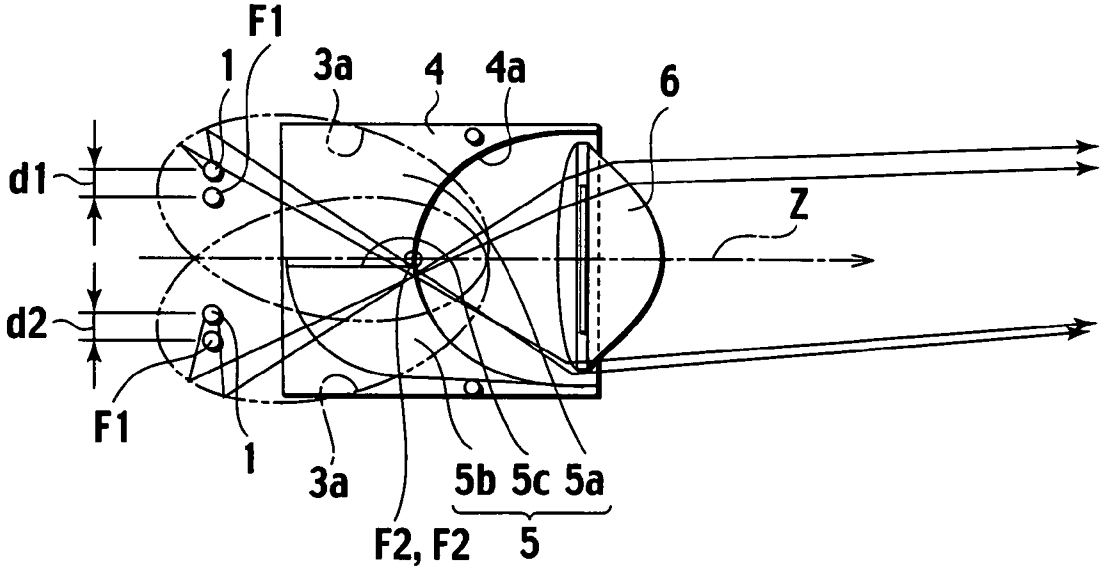

FIGS. 5A and 5B show a projector type vehicle headlamp unit 20 according to a second embodiment of the present invention. The unit 20 has the same configuration as that of the unit 10, except that the arrangement of the two LEDs 1, 1 is different.

That is, according to the unit 20, the second reflecting surface 5 of the sub-reflector 4 has the central step 5*c* formed along the optical axis of the convex lens 6, and the high-position reflecting surface 5*a* and the low-position reflecting surface 5*b* formed at the opposite sides of the central step 5*c*. The two LEDs 1, 1 are arranged with the positions thereof being shifted from the respective first focal positions F1 of the two first reflecting surfaces 3*a*, 3*a* toward the portions where the high-position reflecting surfaces are formed with respect to the central step.

In the second embodiment, since the high-position reflecting surface 5*a* is formed on the left side of the central step 5*c*, the two LEDs 1, 1 are arranged, respectively, by being shifted from the respective first focal point F1 of the two first reflecting surfaces 3*a*, 3*a* to the left side.

Figure 7:
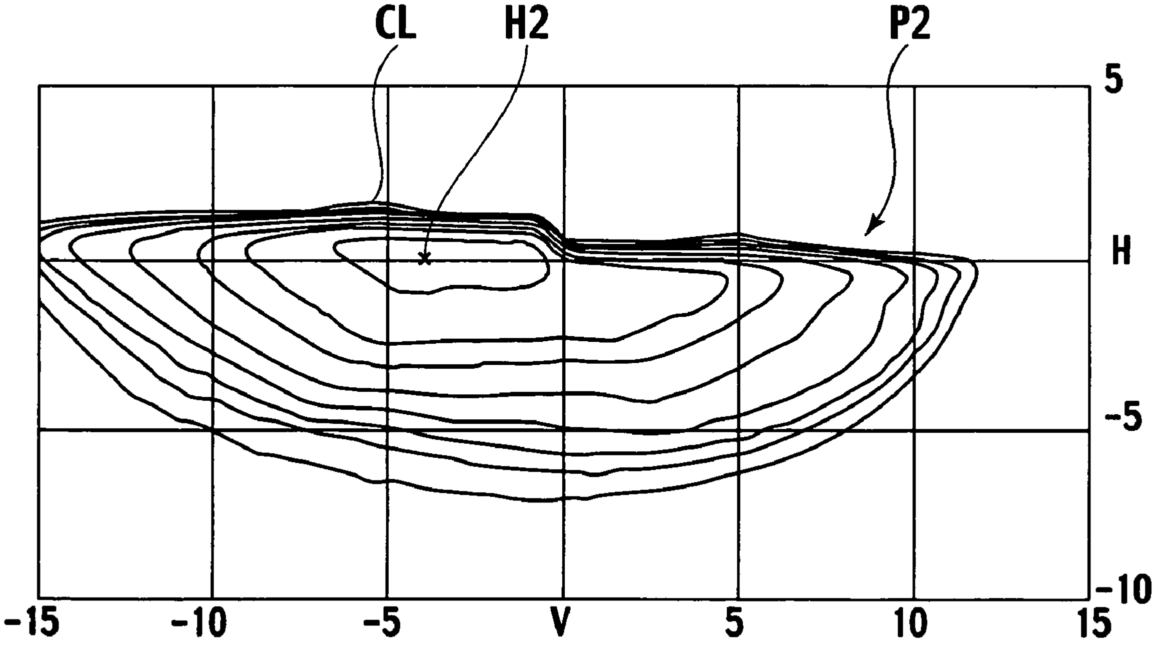
FIG. 7 is a graph showing a light distribution pattern demonstrated by the projector type vehicle headlamp unit according to the second embodiment.

The unit 20 formed in this manner can demonstrate a light distribution pattern P2 having a hot zone center H2, as shown in FIG. 7, with the hot zone being shifted toward the shift direction (left side) as compared to the light distribution pattern P1. Accordingly, the expansion of the light distribution is increased toward the shoulder of the road in the case of left-hand traffic (in Japan, for example), thereby improving the visibility of the driver. Furthermore, by appropriately adjusting the hot zone center position in the light distribution pattern toward the shoulder of the road, the adaptability to the light distribution standard can be increased.

The shift amount at this time is not always the same between the two LEDs 1, 1, and is determined according to the optical position between the first reflecting surfaces 3*a* and/or between the first reflecting surfaces 3*a*, 3*a* and the second reflecting surface 5. It is desired to determine the shift amount in detail based on the light distribution pattern by simulation.

For example, as shown in FIG. 3, in a unit having an effective diameter R of the convex lens 6 being 50 mm, the outer diameter R1 being 55 mm, and the whole length L of the unit being 98 mm, as shown in FIG. 4B, when it is assumed that the shift amount d1 of one LED 1 is 1.0 mm, and the shift amount d2 of the other LED 1 is 0.3 mm, the hot zone center can be shifted toward the shoulder of the road by 3 degrees or so from the position before the shift.

In the case of right-hand traffic (in Europe, North America, etc.), though not shown, the second reflecting surface of the sub-reflector is formed so as to opposite to the left-hand traffic, such that the high-position reflecting surface is formed on the right side, and the low-position reflecting surface is formed on the left side, centering on the central step. The two LEDs are arranged so as to be shifted toward the right, from the respective first focal positions of the two first reflecting surfaces. Also in this case, the expansion of the light distribution is increased toward the shoulder of the road in the case of right-hand traffic (in Europe, North America, etc.), thereby improving the visibility of the driver.

Thus, with this configuration, since the two LEDs can be shifted from the respective first focal positions of the two first reflecting surfaces toward the portion of the second reflecting surface where the high-position reflecting surface is formed, manufacturing to the specification in the left-hand traffic or right-hand traffic is possible. Accordingly, the design becomes simple, and at least the upper casing 11 of the casings can be commonly used, thereby realizing cost reduction due to a decrease in the number of molds.

What is claimed is:

1. A projector type vehicle headlamp unit comprising:

a plurality of light emitting diodes as light sources;

a reflector which reflects light from the light emitting diodes; and a convex lens that emits the light reflected by the reflector forward, wherein the reflector has two first reflecting surfaces arranged in parallel, provided on the upper side at the back of an optical axis of the convex lens, and formed inside of a casing with the front part and the lower part being open as a spheroidal curved surface or a free-form surface based on a spheroid, having a front part and a lower part being open the two first reflecting surfaces are arranged by making first focal points of the first reflecting surfaces be alienated from each other in the horizontal direction, centering on the optical axis within an area of an effective diameter of the convex lens, and making second focal points thereof gradually come close to each other so as to be located inside of the two first focal points, the reflector includes a sub-reflector arranged between the convex lens and the light emitting diodes, the sub-reflector having a substantially flat second reflecting surface along the optical axis of the convex lens and a shading function, the second reflecting surface has a central step formed along the optical axis, and a high-position reflecting surface and a low-position reflecting surface formed on both sides of the central step, and the light emitting diodes include-two light emitting diodes respectively arranged with positions thereof being shifted from the respective first focal points of the two first reflecting surfaces toward the portions where the high-position reflecting surface is formed.

2. A projector type vehicle headlamp unit comprising:

a plurality of light emitting diodes as light sources;

a reflector that reflects light from the LED; and a convex lens that emits the light reflected by the reflector forward, wherein the reflector has two first reflecting surfaces arranged in parallel, provided on the upper side at the back of an optical axis of the convex lens, and formed inside of a casing with the front part and the lower part being open as a spheroidal curved surface or a free-form surface based on a spheroid, having a front part and a lower part being open, the two first reflecting surfaces are arranged in parallel by making first focal points of the first reflecting surfaces be alienated from each other in the horizontal direction, centering on the optical axis within an area of an effective diameter of the convex lens, and making second focal points thereof gradually come close to each other so as to be located inside the two first focal points, the two first reflecting surfaces are arranged by making the two second focal points coincident with each other near the optical axis, the two first reflecting surfaces have an outer size within the outer diameter of the convex lens, the reflector includes a sub-reflector arranged between the convex lens and the light emitting diodes, the sub-reflector having a substantially flat second reflecting surface along the optical axis of the convex lens and a shading function, the second reflecting surface has a central step formed along the optical axis, and a high-position reflecting surface and a low-position reflecting surface formed on both sides of the central step, and the light emitting diodes include two light emitting diodes respectively arranged with light emitting portions thereof facing the two first reflecting surfaces with the positions thereof being shifted from the respective first focal points of the two first reflecting surfaces toward the portion where the high-position reflecting surface is formed.

* * * * *